July 16, 1968     J. N. SHINN     3,392,741
MEANS TO CONTROL THE ADMISSION OF LIQUID INTO A CONTAINER
Filed Oct. 5, 1964
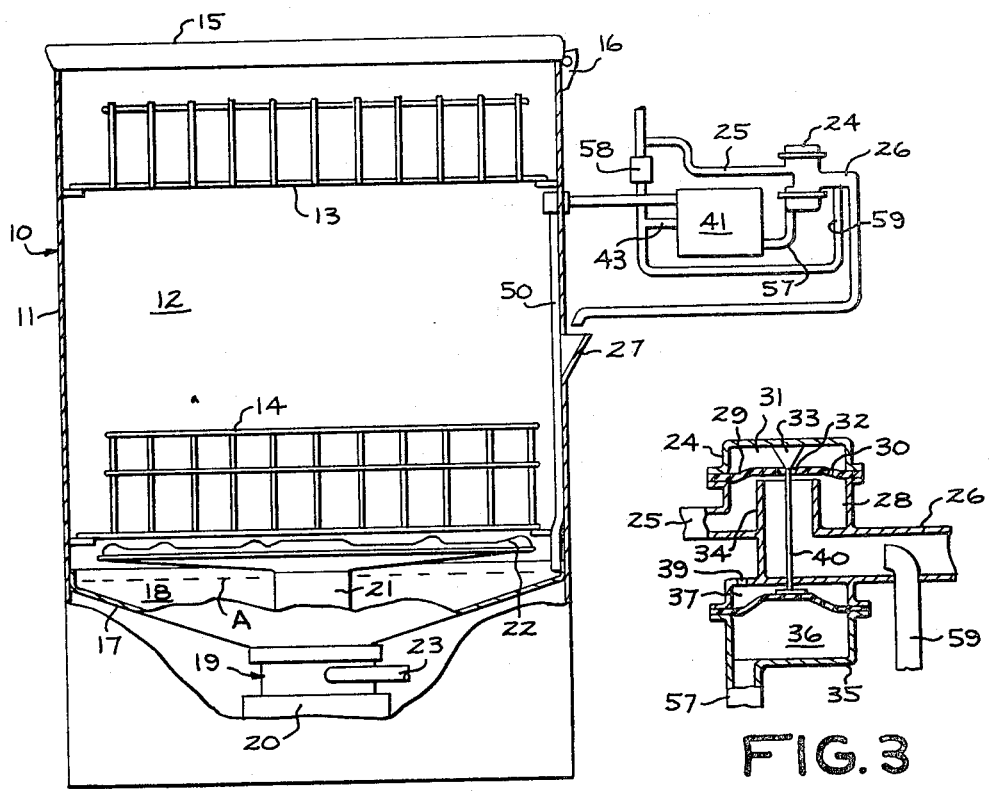
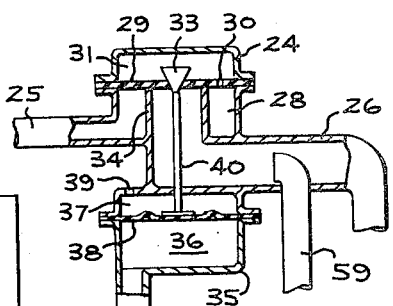
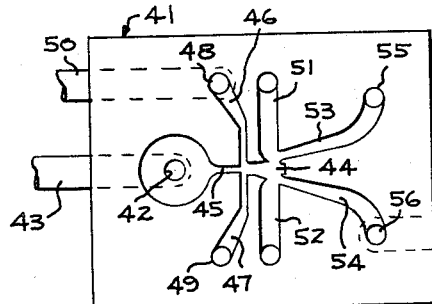
INVENTOR.
JEFFREY N. SHINN
BY *James E. Espe*
HIS ATTORNEY

United States Patent Office

3,392,741
Patented July 16, 1968

3,392,741
MEANS TO CONTROL THE ADMISSION OF
LIQUID INTO A CONTAINER
Jeffrey N. Shinn, Scotia, N.Y., assignor to General
Electric Company, a corporation of New York
Filed Oct. 5, 1964, Ser. No. 401,367
3 Claims. (Cl. 137—81.5)

This invention relates generally to liquid handling means and, more particularly, to an improved means to control the admission of liquid to a container.

There are, of course, many applications for means to control the admission of liquid to a container and one example, as used herein, is in an automatic washing machine. An automatic washing machine undergoes many "fills" of liquid, during a single washing operation, wherein the machine is filled to a suitable level with liquid, operated, drained of liquid and subsequently refilled with liquid. It is important that reliable means be provided to control the admission of liquid into the machine to assure that a sufficient quantity is provided to achieve desired wash results; however, at the same time it is important that an excessive amount of liquid be avoided so that overloading of the machine and/or flooding is prevented. There are many devices commercially available today which will achieve the abovementioned desiderata; however, some are prohibitively expensive and others are excessively unreliable for use in the highly competitive home appliance industry. Therefore, it would be desirable to provide an improved means to control the admission of liquid into a container such as an automatic washing machine which is comparatively inexpensive to manufacture but reliable in operation.

Accordingly, it is an object of this invention to provide an improved means to control the admission of liquid into a container.

It is another object of this invention to provide a means to control the admission of liquid into a container which is relatively inexpensive to manufacture but which provides comparatively reliable operation.

It is also an object of this invention to provide a means to control the admission of liquid into a container which advantageously employs a fluid amplifier.

Briefly stated, in accordance with one aspect of the present invention, there is provided means to control the admission of liquid into a container comprising a valve, and a fluid amplifier having a main inlet, an outlet and a control inlet. A pressure responsive valve operator is mechanically associated with the valve. Means are provided to interconnect the main inlet with a source of liquid under pressure. Also, means are provided to interconnect the outlet with the pressure responsive operator and the control inlet normally aspirates air. The fluid amplifier is designed to normally direct fluid entering the main inlet out through the outlet when the control inlet is free to aspirate air. The fluid exiting from the fluid amplifier through the outlet creates a pressure upon the pressure responsive valve operator to thereby open the valve. With this arrangement the valve remains open as long as the control inlet is free to aspirate air; however, when the quantity of water admitted to the container exceeds a predetermined amount, the control inlet is restricted thereby terminating aspiration which in turn causes the fluid amplifier to switch the fluid entering the main inlet out through a vent or second outlet rather than the outlet communicating with the pressure responsive operator. Since this discontinues the application of pressure to the pressure responsive operator, the valve closes.

While the specification concludes with claims particularly pointing out and distinctly claiming the subject matter which is regarded as the invention, it is believed the invention will be better understood from the following description taken in connection with the accompanying drawing, in which:

FIGURE 1 is an elevational view, partially cut away to show details, of an automatic washing machine with which the present invention may be employed;

FIGURE 2 is an enlarged view of a fluid amplifier and a valve comprising a part of the present invention; and FIGURE 3 is a fragmentary view similar to FIGURE 2 but showing the valve in the open position.

Referring now to the drawing, and particularly to FIGURE 1 thereof, an automatic washing machine in the form of an automatic dishwasher 10 is illustrated and includes an outer cabinet 11 defining therein a wash chamber, or container, 12. Disposed within wash chamber 12 are dish supporting racks 13 and 14 which are adapted to receive and support dishes to be washed within chamber 12. Access to chamber 12 is provided by means of a closure member or door 15 which is provided in one wall of cabinet 11 and which is pivotally secured thereto by means of a hinge 16.

The lower extremity of wash chamber 12 is defined by bottom wall 17 which has a centrally depressed portion forming a sump 18. Positioned within sump 18 and supported by bottom wall 17 in a motor-pump assembly 19 which includes an electricaly-reversible motor 20 and a pump 21. Pump 21 may be directly mechanically linked to motor 20 so that, when motor 20 is operated in one direction of rotation, pump 21 is rotated to withdraw wash fluid from sump 18 and propel it upwardly through a rotatable reaction-type spray arm 22 from which the fluid is sprayed to generate a wash action within chamber 12. In the other direction of rotation of motor 20, pump 21 is rotated to withdraw wash fluid from sump 18 and propel it out through an effluent discharge conduit 23 which communicates with a normal household sewer system (not shown).

Suitable sequence control means (not shown) may be provided to control the electrical energization of the motor 20 as well as any other electrical component necessary to carry out the washing operation of dishwasher 10. Normally, an electrically-operated solenoid valve (not shown) is provided to operate in response to the sequence control means to control the admission of water to wash chamber 12. The solenoid-operated valve is a relatively expensive item in itself and, moreover, further requires a switch operated by the sequence control means to energize or de-energize the valve. Additionally, a solenoid-operated valve provides no flood control or prevention since it is not responsive to the liquid level within the washing machine.

The structure thus far described is substantially conventional in form and, accordingly, the particular structural features of the dishwasher 10 may vary a reasonable extent from that described above without seriously affecting the present invention. As mentioned above, it is necessary to admit water to wash chamber 12 of dishwasher 10 several times during a complete operation of the dishwater. In the past, it has been conventional to provide an electrical solenoid-operated valve, operating in response to the sequence control means, to control the admission of water to wash chamber 12. The solenoid-operated valve provides no overflow or flood protection or prevention since it is responsive only to the sequence control means and is not responsive to the level of liquid within wash chamber 12. Moreover, the solenoid, and the concomitant switching means associated with the solenoid-operated valve are relatively expensive. Accordingly, it is a primary object of this invention to provide means to control the admission of water into a container such as wash chamber 12 which is less expensive than the aforementioned solenoid-operated valve and which further provides an inherent flood prevention feature.

In accordance with the present invention, there is provided a valve 24 having an inlet conduit 25 which is connected to a source of water under pressure (not shown). Valve 24 is also provided with an outlet conduit 26 which terminates in liquid dispensing relation with a fill funnel 27 in cabinet 11 of dishwasher 10. Of course, water passing through valve 24 and conduit 26 will enter wash chamber 12 through the fill funnel 27.

Referring now to FIGURE 2, valve 24 is shown in sectional view to reveal the internal components thereof. Inlet conduit 25 communicates with an annular cavity 28 within valve 24. The upper extremity of cavity 28 is defined by a flexible diaphragm 29 having therethrough a small orifice 30. The upper portion of the housing of valve 24 and diaphragm 29 define a chamber 31. An opening 32, as seen in FIGURE 3, extends through diaphragm 29 at or near the center thereof. Opening 32 is normally closed by a plunger 33.

With the afore-described arrangement, water under pressure enters cavity 28 through conduit 25 and will, of course, tend to flex diaphragm 29 upwardly due to the force created by the water pressure. Orifice 30 allows the water in cavity 28 to gradually enter chamber 31 so that, after a few seconds, there is substantially equal pressure in both cavity 28 and chamber 31. Chamber 31 comprises a larger areal portion of diaphragm 29 than does cavity 28 and this creates a resultant downward force on diaphragm 29 since the force applied to each side of diaphragm 29, due to the substantially equal pressures on each side, is directly proportional to the respective areas. Accordingly, diaphragm 29 is normally forced into contact with the upper end of a standpipe 34 to thereby maintain valve 24 closed.

Means are provided to open valve 24 and include a pressure responsive valve operator 35 having therein chambers 36 and 37 separated by a flexible diaphragm 38. Chamber 37 is vented to the atmosphere by means of an opening 39. With this arrangement, as a sufficient pressure is applied to chamber 36, diaphragm 38 is flexed upwardly with any fluid in chamber 37 being vented out through opening 39. As movement is imparted to diaphragm 38, it is transferred to a stem 40 which interconnects diaphragm 38 and plunger 33. Accordingly, movement of diaphragm 38 results in an upward movement of plunger 33 thereby allowing the release of the pressure in chamber 31 through opening 32.

In FIGURE 3 valve 24 is illustrated in the open position. It can be seen that the release of pressure in chamber 31 results in an upward flexing of diaphragm 29 by the pressure in chamber 28. The upward movement of diaphragm 29 separates diaphragm 29 from the upper end of standpipe 34 thereby allowing the fluid in chamber 28 to escape into standpipe 34 and eventually travel out through conduit 26.

In accordance with the present invention, a fluid amplifier 41 is provided to selectively apply pressure to chamber 36. Fluid amplifier 41 has a main inlet 42 which communicates with a conduit 43 in fluid receiving relation thereto. Internally of fluid amplifier 41 main inlet 42 is interconnected with a chamber 44 by a passageway 45. At the point where passageway 45 enters chamber 44 passageways 46 and 47 also enter chamber 44. Passageway 46 interconnects a control inlet 48 with chamber 44 while passageway 47 interconnects a control inlet 49 with chamber 44. External of fluid amplifier 41 control inlet 48 communicates with a conduit 50. Opening at opposite sides of chamber 44 are vents 51 and 52. Passageways 53 and 54 respectively interconnect outlets 55 and 56 with chamber 44. Outlet 56 is externally connected to a conduit 57 which in turn communicates with chamber 36 in valve operator 35.

Fluid amplifiers, of the type illustrated herein, which is the type utilizing a side control jet to deflect a main inlet fluid flow into one of several outlet passages, are well known. In this type of device a main flow passageway is connected to a chamber from which outlet passageways lead off. At the point where the main flow enters the chamber, side ports for passage of control fluid transverse to the main flow are provided which, by selectively allowing such control fluid to flow, will control the main flow by deflecting it into the desired outlet passage. These devices are therefore referred to as fluid amplifiers due to the fact that a small control fluid flow may be utilized to control the flow of a large fluid stream. In addition, such devices may be made to be bi-stable, that is once the primary stream is deflected to flow through an outlet, the boundary layer effect between this stream and the flow passage wall tends to lock the primary stream to flow in this direction.

The operation of the device thus far described is as follows. Referring briefly to FIGURE 1, a normally closed auxiliary valve 58 is disposed between conduit 43 and the household plumbing system to which conduit 25 is also connected. Valve 58 may be a manually-operated valve or a valve operated by the aforementioned sequence control means provided for dishwasher 10. Valve 58 is momentarily opened which allows fluid to flow through conduit 43 and into main inlet 42 of fluid amplifier 41. From inlet 42, the fluid passes through passageway 45 into chamber 44. Fluid amplifier 41 is internally designed, i.e., chamber 44 is configurated, so that when conduit 50 is unrestricted, the flow of fluid through passageway 45 will aspirate air in through passageway 46 and the resulting mixture will exit from chamber 44 through passageway 54 and outlet 56. The flow of fluid from outlet 56 passes through conduit 57 and into chamber 36 of valve operator 35.

The flow of fluid into chamber 36 of course results in the movement of diaphragm 38 and the resulting opening of valve 24 as previously discussed. The opening of valve 24 allows a flow of water from conduit 25 through valve 24 into conduit 26 and eventually into wash chamber 12. Extending into conduit 26 is a conduit 59 which faces upstream in a pitot tube fashion to tap off part of the flow through conduit 26. The flow thus tapped off passes through conduit 59 and eventually to conduit 43 whereupon it serves as the fluid passing into fluid amplifier 41 through main inlet 42. Once fluid flow through conduit 59 is established, valve 58 may then be closed and the system will be self-sustaining, i.e., as long as valve 24 remains open flow through fluid amplifier 41 will tend to maintain valve 24 open.

This situation will obtain only as long as conduit 50 remains unrestricted so that air may be aspirated through conduit 50, control inlet 48 and passageway 46 into chamber 44. Fluid amplifier 41 is internally configurated so that once conduit 50 is restricted against aspiration, fluid entering chamber 44 from passageway 45 will be switched to exit from chamber 44 through passageway 53 and outlet 55 rather than passageway 44 and outlet 56. As best illustrated in FIGURE 1, conduit 50 extends down into wash chamber 12 and has an open terminal end situated near bottom wall 17. As the water level in wash chamber 12 reaches the desired level, which is indicated by dashed line A, the terminal end of conduit 50 will become submerged which will, in effect, restrict the aspiration of air through conduit 50. When this occurs, fluid pressure will no longer be applied to chamber 36 of valve operator 35 and therefore valve 24 will close terminating the admission of water to wash chamber 12.

Outlet 55 may be provided with a conduit (not shown) communicating with wash chamber 12 so that the fluid entering main inlet 42 and exiting through outlet 55 upon restriction of conduit 50, for the short period of time while valve 24 is closing, may be conveniently dispensed into chamber 12. Also, during the time that conduit 50 is aspirating and fluid is exiting from fluid amplifier 41 through outlet 56, vents 51 and 52 will vent any excess fluid which builds up as chamber 36 becomes filled with liquid. Vents 51 and 52 similarly vent any excess fluid which may result from a restriction downstream from outlet 55. If desired, it would be possible to provide a small orifice-like outlet in chamber 36, draining into wash chamber 12, to maintain a dynamic condition of the fluid exerting pressure against diaphragm 38.

It should be realized, of course, that the precise configuration of fluid amplifier 41 may vary somewhat from that illustrated in the drawing. For example, control inlet 49 and passageway 47 may be deleted all together if fluid amplifier 41 is modified slightly to operate in a manner whereby the main fluid stream can be switched from one outlet to the other simply by opening or closing control inlet 48.

Thus it can be seen that the present invention provides a relatively inexpensive, though reliable, means to control the admission of liquid to a container such as the wash chamber of an automatic dishwasher. The means illustrated costs only a fraction of the cost of a solenoid-operated valve and, at the same time, has no moving parts subject to wear and eventual malfunction. It should also be appreciated that the above-described arrangement provides an inherent overflow or flood protection feature.

As will be evident from the foregoing description, certain aspects of the invention are not limited to the particular details of construction of the example illustrated, and it is contemplated that other modifications or applications will occur to those skilled in the art. It is therefore intended that the appended claims shall cover such modifications and applications as do not depart from the true spirit and scope of the invention.

I claim:
1. Means to control the admission of liquid into a container comprising:
  (a) a main valve,
  (b) a pressure responsive operator to selectively open or close said valve,
  (c) a device comprising:
    (aa) a main inlet,
    (bb) an outlet,
    (cc) a control inlet, and
    (dd) a chamber interconnecting said main inlet, said outlet and said control inlet,
    (ee) said chamber being configurated to direct liquid entering said main inlet out through said outlet when said control inlet is free to aspirate air,
  (d) an auxiliary valve to momentarily admit liquid under pressure to said main inlet,
  (e) means interconnecting said outlet with said pressure responsive operator whereby liquid leaving said device through said outlet applies a pressure to said pressure responsive operator, and
  (f) fluid conducting means interconnecting the outlet of said main valve with said main inlet whereby at least a portion of the liquid passing through said main valve is conducted to said main inlet.

2. Means to control the admission of liquid into a container comprising:
  (a) a valve,
  (b) means to interconnect said valve with a source of liquid under pressure,
  (c) a pressure responsive operator to open said valve,
  (d) a fluid amplifier comprising:
    (aa) a main inlet communicating with the source of liquid under pressure,
    (bb) an outlet communicating with said pressure responsive operator,
    (cc) a control inlet, and
    (dd) a chamber interconnecting said main inlet, said outlet and said control inlet,
    (ee) said chamber being configurated to direct liquid entering said main inlet out through said outlet when said control inlet is free to aspirate air, and
  (e) fluid conducting means extending into the container and having an open terminal end at a predetermined height,
  (f) said fluid conducting means being free to aspirate air until the level of liquid within the container reaches a predetermined desired level whereupon said fluid conducting means is restricted against aspiration,
  (g) said fluid conducting means communicating with said control inlet.

3. Means to control the admission of liquid into a container comprising:
  (a) a main valve,
  (b) a pressure responsive operator to selectively open or close said valve,
  (c) a device comprising:
    (aa) a main inlet,
    (bb) an outlet,
    (cc) a control inlet, and
    (dd) a chamber interconnecting said main inlet, said outlet and said control inlet,
    (ee) said chamber being configurated to direct liquid entering said main inlet out through said outlet when said control inlet is free to aspirate air,
  (d) an auxiliary valve to momentarily admit liquid under pressure to said main inlet,
  (e) means interconnecting said outlet with said pressure responsive operator whereby liquid leaving said device through said outlet applies a pressure to said pressure responsive operator,
  (f) first fluid conducting means interconnecting the outlet of said main valve with said main inlet whereby at least a portion of the liquid passing through said main valve is conducted to said main inlet, and
  (g) second fluid conducting means communicating with said control inlet and extending into the container and having an open terminal end therein whereby as the liquid level in the container reaches the open terminal end of said second fluid conducting means said control inlet will be restricted against aspiration of air.

References Cited

UNITED STATES PATENTS

| | | | |
|---|---|---|---|
| 3,030,979 | 4/1962 | Reilly | 137—81.5 |
| 3,072,147 | 1/1963 | Allen | 137—81.5 |
| 3,122,165 | 2/1964 | Horton | 137—81.5 |
| 3,176,920 | 4/1965 | Severson | 137—81.5 |
| 3,226,530 | 12/1965 | Greenblott | 137—81.5 |
| 3,267,949 | 8/1966 | Adams | 137—81.5 |

M. CARY NELSON, *Primary Examiner.*

W. R. CLINE, *Assistant Examiner.*